United States Patent [19]

Kaufman et al.

[11] Patent Number: 4,682,571

[45] Date of Patent: Jul. 28, 1987

[54] EXHAUST GAS RECIRCULATION SYSTEM FOR CRANKCASE SCAVENGED TWO CYCLE ENGINE

[75] Inventors: Vernon R. Kaufman, Cedarburg; Miles S. Geringer, Milwaukee, both of Wis.

[73] Assignee: Tecumseh Products Company, Tecumseh, Mich.

[21] Appl. No.: 810,063

[22] Filed: Dec. 17, 1985

[51] Int. Cl.$^4$ ............................................. F02B 33/04
[52] U.S. Cl. .................................. 123/73 A; 123/570; 60/320
[58] Field of Search ...................... 123/73 A, 568, 570, 123/73 R; 60/320, 321, 278

[56] References Cited

U.S. PATENT DOCUMENTS

| 792,300 | 6/1905 | Weiss . | |
|---|---|---|---|
| 904,267 | 11/1908 | Korting et al. . | |
| 1,178,276 | 4/1916 | Straubel | 123/73 A |
| 2,701,556 | 2/1955 | Woerner | 123/570 |
| 2,740,390 | 4/1956 | Irgens | 123/73 R |
| 3,687,118 | 8/1972 | Nomura | 123/73 R |
| 3,980,064 | 9/1976 | Ariga et al. | 123/568 |
| 4,135,481 | 1/1979 | Resler | 123/568 |
| 4,204,488 | 5/1980 | Onishi | 123/73 A |
| 4,204,489 | 5/1980 | Onishi | 123/73 A |
| 4,213,431 | 7/1980 | Onishi | 123/73 A |
| 4,242,993 | 1/1981 | Onishi | 123/59 B |
| 4,318,373 | 3/1982 | Soubis | 123/73 R |
| 4,383,503 | 5/1983 | Griffiths | 123/73 PP |
| 4,543,921 | 10/1985 | Torigai et al. | 123/73 R |

*Primary Examiner*—Craig R. Feinberg
*Assistant Examiner*—David A. Okonsky
*Attorney, Agent, or Firm*—Jeffers, Hoffman & Niewyk

[57] ABSTRACT

A two cycle crankcase scavenged internal combustion engine having an exhaust gas recirculation system. Exhaust gas from the coolest part of the exhaust muffler is recirculated back to the crankcase in a controlled discrete charge on each cycle of the engine. A recirculation port extends through the cylinder sidewall and is opened briefly during the compression stroke of the piston to thereby enhance vaporization of the fuel and increase velocity of the scavenging air-fuel mixture into the combustion chamber.

18 Claims, 1 Drawing Figure

EXHAUST GAS RECIRCULATION SYSTEM FOR CRANKCASE SCAVENGED TWO CYCLE ENGINE

BACKGROUND OF THE INVENTION

The present invention relates to a two cycle crankcase scavenged internal combustion engine, and in particular to a system for enhancing vaporization of the fuel-air charge and for more thoroughly scavenging residual hot gases from the combustion chamber.

In two cycle engines, residual exhaust gas remains in the combustion chamber due to incomplete scavenging. The residual exhaust gas is at a high temperature so that the subsequent charge of fuel-air mixture entering the combustion chamber is heated by the residual gas and produces radicals. The presence of radicals in the combustion chamber produces an active thermoatmosphere, which causes engine run-on, also known as active thermoatmosphere combustion, extraordinary combustion or self ignition. Self ignition can occur over a fairly broad speed and load range in low compression engines, for example, having a compression range of 6:1–8:1, without the combustible air-fuel mixture being ignited by a spark plug. Larger displacement engines are more susceptible than small displacement engines because of differences in combustion chamber compactness and the consequent inability to adequately scavenge the hot exhaust gases in the larger displacement engines, particularly when the engine is operated under part throttle speed and load conditions.

On the fringes of run-on, erratic operation of the engine, backfiring, misfiring and severe knock can result, all of which are very undesirable and may cause internal damage to the engine. Under light load or wide open throttle operating conditions, there may be some run-on but not enough to sustain engine operation without sparkplug ignition. This results in some cycles of run-on being interspersed with normal combustion cycles, thereby resulting in uneven engine operation.

A further problem with run-on is that a conventional ignition interrupt switch will not stop the engine when it is operating in a run-on condition, because under run-on conditions, there is no necessity for an ignition spark except during starting and warm up. Although an engine operating under run-on conditions can be stopped by altering the speed, load or fuel mixture or totally interrupting the flow of fuel to the combustion chamber, there is a certain amount of delay before the engine stops. Furthermore, this type of shut off system is more complex than the simple ignition shut off switches presently used.

It is relatively common for air cooled two cycle engines to experience exhaust port blockage and deposits in the combustion chamber after a certain number of hours of operation, and both of these conditions can cause run-on to occur. Ring seating will also make run-on more likely. Thus, run-on is more prevalent the longer the engine has been operating.

A rich fuel-air mixture is effective in preventing run-on, so if the engine is equipped with a fixed main and idle carburetor, it is possible to factory set the mixture rich enough to eliminate the possibility of run-on under normal operating conditions. However, even if such a carburetor is used, leaning of the mixture may later occur due to a number of causes. For example, the air vent to the fuel tank or reservoir might become partially obstructed, which would cause a partial vacuum to occur in the tank thereby reducing the flow of fuel to the carburetor and resulting in a leaner mixture. Gum or debris may partially block the fuel filter or screen or gum or debris may partially block the fuel metering passages, thereby also resulting in a leaner mixture. Another possible cause of lean mixture is air leakage into the crankcase or induction system caused by damaged or worn crankcase seals, damaged castings, hardware inadequately tightened when servicing or hardware loosened due to vibration. Any one of these conditions can cause the mixture to become sufficiently lean that run-on conditions occur.

An adjustable main and idle carburetor may result in the engine being adjusted by the user to the point where run-on conditions occur. Adjusting the carburetor so that the engine runs leaner results in smoother and quieter operation of the engine. However, a leaner fuel-air mixture also results in less lubricant entering the engine with the fuel thereby reducing lubrication of the piston and causing piston ring sticking, scuffing or scoring. Furthermore, if the mixture is leaned out too far, run-on conditions will occur and the conventional ignition switch will not be effective to stop the engine.

A further problem with residual exhaust gas and resulting pre-ignition is that the cylinder does not cool to the same extent as under normal combustion conditions. This results in higher piston temperatures thereby causing scuffing, scoring and piston ring sticking.

Another problem experienced with conventional crankcase scavenged two cycle engines is that of incomplete vaporization of the fuel. In such engines, the areas and volumes change drastically from the carburetor to the combustion chamber, and additionally, intake valving such as reed, rotary or poppet valves and piston ports operate as flow barriers which tend to condense the fuel vapor into droplets. Moreover, the rotation of the crankshaft within the crankcase creates a windage which tends to direct droplets and also the vapor onto the crankcase walls. Unless this condensed liquid fuel is vaporized in the crankcase, it enter the combustion chamber in a liquid state, is difficult to ignite thereby resulting in slow burning or missing.

When a two cycle crankcase scavenged engine is first started and the engine is cold, the condensed liquid fuel accumulates in a low spot in the crankcase and results in a condition commonly known as "puddling". Because a significant portion of the fuel is not drawn into the combustion chamber, the mixture becomes excessively lean thereby resulting in poor ignition. Although this lean starting condition can be partially offset by choking the carburetor to create a rich mixture for starting, it is impossible to achieve an optimum mixture for ignition until the combustion chamber and crankcase have warmed up adequately to cause proper fuel vaporization. During this warm up period, the engine is noisy, runs rough and smokes excessively due to the poor ignition of the mixture. This problem is particularly prevalent in engines used in cold weather applications such as snowthrowers, ice augers and snowmobiles. If the carburetor is calibrated to supply a richer mixture for the cool conditions, it will be excessively rich when the engine is at normal operating temperatures.

It has been found that the recirculation of warm, inert gas, such as uncombustible exhaust gas, into the crankcase enhances fuel vaporization, thereby making the fuel-air mixture more combustible. It is known to inject a charge of exhaust gas into the crankcase, but in that case, the exhaust gas was taken directly from the exhaust manifold, and it is therefore hot and contains a substantial amount of uncombusted fuel. The recirculation of very hot exhaust gas causes excessive crankcase temperatures which can result in breakdown of the lubricant thereby causing bearing failures. Also, the recirculation of exhaust gas that has a substantial amount of uncombusted fuel will cause the deposit of particulate matter on the recirculation port thereby blocking the port.

SUMMARY OF THE INVENTION

In accordance with the present invention, in one form thereof, a charge of warm inert gas, such as fully combusted exhaust gas, is injected into the crankcase during the compression stroke of the piston just before the top dead center (TDC) position of the piston. The exhaust gas is drawn from the exhaust muffler at a point substantially downstream from the exhaust port so that the exhaust gas by this time has cooled and is substantially inert, that is, containing very little uncombusted fuel and little oxygen.

Fuel vaporization is enhanced by the warm inert gas drawn into the crankcase thereby resulting in easier ignition and faster engine warm up time. Moreover, the combustion chamber pressures and temperatures are lower because the additional inert exhaust gas increases the velocity of the incoming charge which quenches the remaining hot residual gases that cause pre-ignition and run-on.

One potential problem with injecting exhaust gases into the crankcase is that the passageway connecting the exhaust system to the crankcase is subject to carbon formation and eventual blockage thereby terminating the controlled injection of warm exhaust gas into the crankcase and creating the possibility that run-on could occur. Accordingly, it is desirable to draw the exhaust gas from the lowest temperature area of the exhaust system that is economically feasible so that exhaust port blockage occurs prior to blockage of the exhaust recirculation passageway. It is also desirable to locate this passageway in such a manner that when the exhaust system components, such as the muffler or exhaust manifold, are removed to clean the ports during normal maintenance, the exhaust gas recirculation passageway is also exposed so that it can be easily cleaned at that time if required.

In a preferred form of the invention, the exhaust gas is drawn from the exhaust muffler at a position near the outlet opening to the atmosphere so that the recirculated exhaust gas has been cooled by passage through the muffler and is relatively inert so as not to affect the richness of the air-fuel mixture in the crankcase. By recirculating warm exhaust gas as opposed to hot exhaust gas, excessive heating of the exhaust gas recirculation passage and the engine crankcase are avoided. Excessive crankcase temperatures can result in breakdown of the lubricant thereby causing bearing failures.

In a preferred form of the invention, the exhaust recirculation passage is timed to open when there is a low pressure in the exhaust system and a low vacuum in the crankcase, which occurs during the compression stroke of the piston just before top dead center. By recirculating the exhaust gas at this time, the exhaust gas temperature in the exhaust system will be at its lowest level during the engine cycle. This is accomplished by locating the exhaust gas recirculation passage so that it enters the crankcase in the cylinder bore just below the piston skirt when the piston is at about top dead center. Thus, the piston skirt alternately covers and uncovers the recirculation passage thereby achieving a timed and controlled gas flow without the necessity for any additional apparatus.

In accordance with one form of the invention, there is provided a two cycle, crankcase scavenged engine having a cylinder with a piston reciprocably disposed therein forming a combustion chamber, a crankcase and an exhaust port opening into the combustion chamber. An exhaust system is connected to the exhaust port and conducts exhaust gas away from the engine, and means are provided for forming an air-fuel mixture and introducing the mixture into the crankcase through an intake opening. A transfer passage connects the crankcase to the combustion chamber. An exhaust recirculation port opens into the crankcase and an exhaust gas recirculation system is connected to the exhaust system for recirculating the exhaust gas into the crankcase through the recirculation port. The recirculated exhaust gas is a warm inert gas preferably drawn from a downstream portion of the exhaust muffler.

The invention further provides, in one form thereof, a two cycle crankcase scavenged engine comprising a crankcase, a cylinder having a sidewall, a piston reciprocably disposed in the cylinder and forming with the cylinder a combustion chamber, an exhaust port opening into the combustion chamber and a muffler connected to the exhaust port. An air-fuel mixture forming device introduces an air-fuel mixture into the crankcase through an intake opening, and a transfer passage connects the crankcase to the combustion chamber. An exhaust recirculation port extends through the cylinder sidewall and is located below the piston. It is opened by the piston when the piston is about at top dead center and is closed off by the piston at all other times in the cycle of the engine. A conduit connects the recirculation port to the muffler, the conduit communicating with the muffler at a position located away from the exhaust port so that the exhaust gas is cooled before entering the conduit.

The invention also provides, in another form thereof, a method of enhancing the vaporization of the air-fuel mixture in a two cycle crankcase scavenged engine. The exhaust gas is directed from the combustion chamber of the engine through a muffler to cool the exhaust gas, and then a portion of the cooled exhaust gas is recirculated from the muffler to the crankcase of the engine as a discrete charge injected into the crankcase on each cycle of the engine.

It is an object of the present invention to provide a two cycle crankcase scavenged engine wherein warm inert exhaust gas is recirculated into the crankcase to thereby enhance vaporization of the air-fuel mixture and to increase the velocity of the air-fuel mixture into the combustion chamber.

BRIEF DESCRIPTION OF THE DRAWING

The drawing is an elevational view of a two cycle crankcase scavenged engine in accordance with the present invention with the upper portion thereof shown in section.

DETAILED DESCRIPTION

Figure 1:
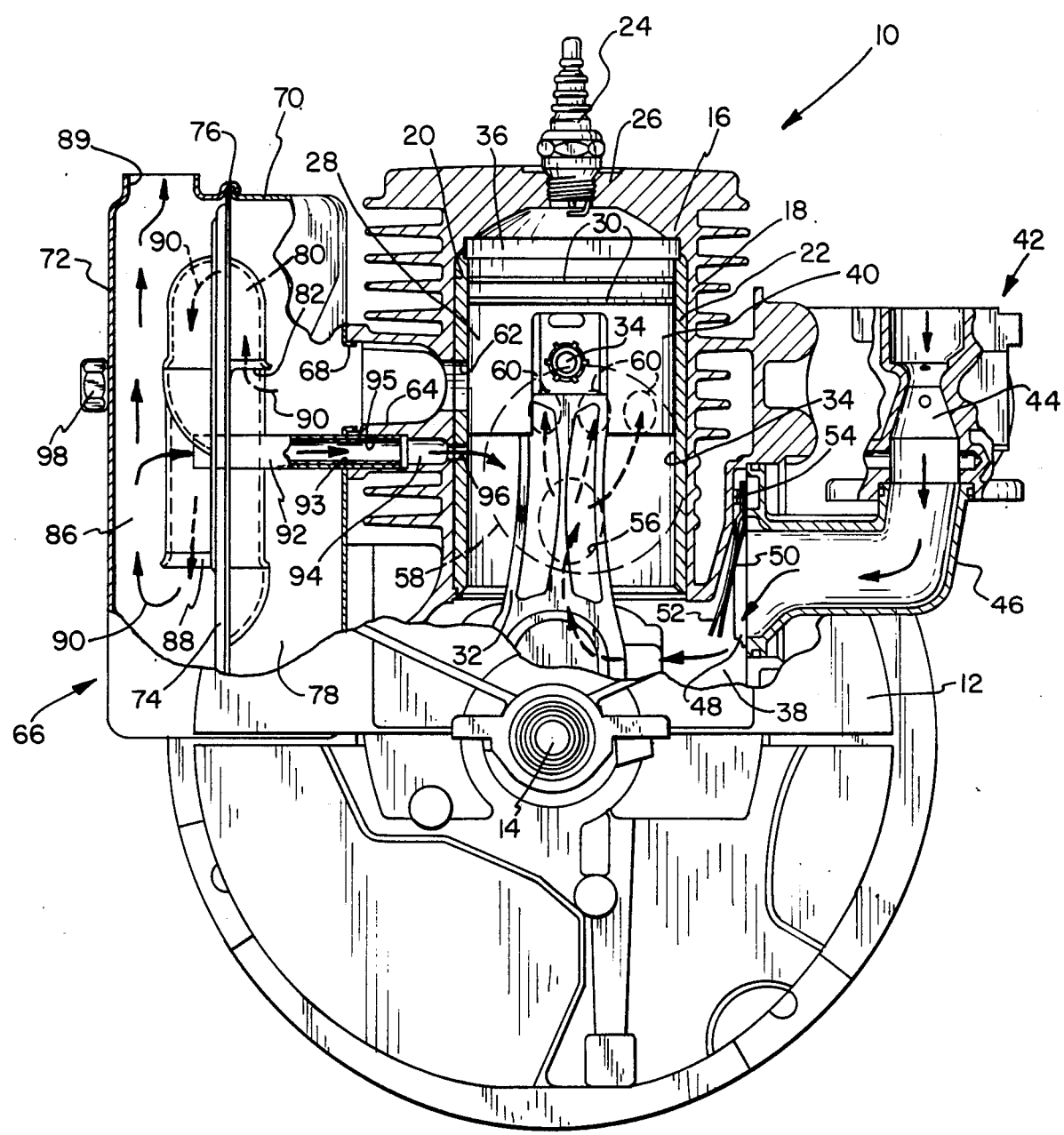

Referring now to the drawing, there is shown a two cycle engine 10 having a crankcase 12 and a crankshaft 14 disposed within crankcase 12. Cylinder 16 is formed integrally with crankcase 12 and comprises a sidewall portion 18 having a bore 20 therein in which is received cylinder liner 22. A sparkplug 24 is threadedly secured to head 26 of cylinder 16, and is fired by conventional ignition circuitry. Engine 10 is a small displacement engine typically used in such applications as snow-throwers, snowmobiles and lawnmowers.

A piston 28 having rings 30 is connected to connecting rod 32 by wrist pin 34, and connecting rod 32 in turn is connected to crankshaft 14 in the normal manner. Piston 28 reciprocates within the bore 34 of cylinder liner 22 and forms with cylinder 16 combustion chamber 36. Piston 28 includes a skirt portion 40 that slides against the inner surface 34 of cylinder liner 22. The interior space 38 of crankcase 12 is open to the interior of cylinder liner 22 beneath piston 28.

Carburetor 42 includes a throat portion 44, and is connected to intake manifold 46, the latter being connected to crankcase 12 through intake opening 48. Reed valve 50 opens and closes intake opening 48 depending upon the pressure within crankcase 12 so that air-fuel mixture is drawn into the interior space 38 of crankcase 12, yet backflow of the mixture through intake manifold 46 is prevented by the closing of valve 50 when the pressure within crankcase 12 exceeds that within intake manifold 46. Valve 50 and valve retainer 52 are connected to intake manifold 46 to staked bosses 54.

The interior space 38 of crankcase 12 communicates with combustion chamber 36 through transfer port 56, transfer passage 58 and intake ports 60. Port 56 is an opening in cylinder liner 22 and communicates with transfer passage 58, which is a space formed between liner 22 and cylinder 16 in the usual manner. Intake ports 60 are openings that extend through liner 22 and are disposed above piston 28 as piston 28 is near the bottom dead center (BDC) position.

Exhaust port 62 extends through cylinder liner 22 and communicates with exhaust manifold 64. Exhaust port 62 is located such that it is disposed above piston 28 when piston 28 moves toward the bottom dead center position. Muffler 66 made of relatively thin, stamped sheet metal is connected to exhaust manifold 64 by flange 68. Muffler 66 comprises first and second halves 70 and 72 and a center, welded two-piece baffle element 74, all of which are joined together at seam 76. Muffler 66 comprises a first chamber 78, which communicates with a U-shaped second chamber 80 through opening 82 that opens into third chamber 86 through opening 88. Thus, the exhaust gas flows through the serially connected chambers 78, 80 and 86 and out opening 89 to the atmosphere as indicated by arrows 90.

A recirculation conduit 92 in the form of a spiral spring steel tube, extends through opening 93 and an opening in baffle 74 from the muffler chamber 86 furthest away from exhaust port 62 to exhaust recirculation passage 94. Tube 92 is removably pressed into opening 95 in cylinder 16. Passage 94 communicates through port 96 extending through liner 22 and opening into the interior of cylinder liner 22 beneath piston 28 when piston 28 is in the top dead center position.

Muffler 66 is removably attached to cylinder 16 by means of screw 98 so that access may be had to exhaust manifold 64 and exhaust port 62 in order to clean deposits therefrom during the course of normal maintenance. It will be noted that exhaust recirculation port 96 is positioned just below exhaust port 62 so that when muffler 66 and conduit 92 are removed, recirculation port 96 and passage 94 can also be cleaned. Due to the fact that the exhaust gas recirculated through passage 94 and 96 is cooler than exhaust gas at port 62, exhaust port 62 will build up with deposits more quickly than recirculation port 96 so that the necessity for cleaning exhaust port 62 will occur before recirculation port 96 becomes blocked, and both ports 62 and 96 can be cleaned at the same time.

Engine 10 operates in the following manner. On the compression stroke of piston 28 in the upward direction as shown in the drawing, air-fuel mixture is drawn from carburetor 42 through intake manifold 46 and valve 50 into the space 38 within crankcase 12. On the downward power stroke of piston 28, pressure in crankcase space 38 increases, thereby closing valve 50 and forcing the air-fuel mixture through port 56 into transfer passage 58, so that when the top of piston 28 clears intake ports 60, the fresh air-fuel charge will flow into combustion chamber 36.

Piston 28 then moves upwardly and compresses the air-fuel mixture within combustion chamber 36, and at about top dead center, sparkplug 24 ignites the mixture thereby driving piston 28 downwardly. When the top of piston 28 clears exhaust port 62, hot exhaust gases begin to flow out exhaust ports 62 into exhaust manifold 64. Shortly thereafter, intake ports 60 are uncovered by piston 28 and a fresh air-fuel charge flows into combustion chamber 36 and scavenges the remaining exhaust gases therefrom through exhaust port 62. The exhaust gases flow through exhaust manifold 64 and through serially connected chambers 78, 80, 84 and 86 whereupon the exhaust gases are cooled due to expansion and contact with the thin sheet metal muffler 66 that is exposed to the ambient. The exhaust gases then exit through opening 89.

Exhaust recirculation port 96 is normally covered by the skirt portion 40 of piston 28, but as piston 28 approaches the top dead center position as shown in the drawing, recirculation port 96 is exposed to the interior of cylinder liner 22 and to crankcase space 38. Cooled exhaust gas, which at this point is substantially lower in temperature than the gas at exhaust port 62, flow through conduit 92, recirculation passage 94 and recirculation port 96 into crankcase 38 where they mix with and warm the charge of air-fuel drawn into crankcase 38 through opening 48. At this point in the cycle of engine 10, there is low pressure in the exhaust muffler 66 and a low vacuum in crankcase space 38.

The incoming warm exhaust gas enhances vaporization of the air-fuel mixture within crankcase space 38 and tends to vaporize any condensed liquid fuel or fuel that has puddled in crankcase 12. Due to the elevated temperature of the air-fuel mixture caused by the recirculated exhaust gas, the velocity of the air-fuel mixture into combustion chamber 36 is increased thereby enhancing scavenging of the residual hot gases.

As piston 28 continues its downward movement past top dead center, recirculation port 96 is again closed off and remains closed until it is again opened on the compression stroke of piston 28.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A two cycle crankcase scavenged engine comprising:
   a crankcase,
   an engine having a sidewall,
   a piston reciprocably disposed in said cylinder and forming with said cylinder a combustion chamber,
   an exhaust port opening into said combustion chamber,
   a muffler connected to said exhaust port,
   means for forming an air-fuel mixture and introducing the mixture into said crankcase through an intake opening,
   a transfer passage connecting said crankcase to said combustion chamber,
   an exhaust recirculation port extending through said cylinder sidewall, said recirculation port being located below said piston and being opened by the piston when the piston is about at top dead center and being closed off by said piston at all other times in the cycle of the engine, and
   a conduit connecting said recirculation port to said muffler, said conduit communicating with said muffler at a position located away from said exhaust port so that the exhaust gas is cooled before entering said conduit.

2. The engine of claim 1 wherein said muffler includes a plurality of serially interconnected chambers and an outlet opening to the atmosphere and connected to a chamber furthest from said exhaust port, and said conduit is connected to said chamber furthest from said exhaust port.

3. In a two cycle crankcase scavenged engine, a method of enhancing the vaporization of the air-fuel mixture comprising:
   directing hot exhaust gas from the cylinder of the engine through a muffler to cool the exhaust gas, and recirculating a portion of the cooled exhaust gas from the muffler into the crankcase of the engine in the form of a discrete charge injected into the crankcase on each cycle of the engine.

4. The method of claim 3 wherein the discrete charge of recirculated exhaust gas is injected into the crankcase at about the end of the combustion chamber compression stroke of the engine.

5. The method of claim 3 wherein the step of cooling the exhaust gas comprises flowing the exhaust gas from an exhaust port in the combustion chamber through a series of serially connected chambers in the muffler, and recirculating a portion of the exhaust gas from a chamber of the muffler furthest away from the exhaust port.

6. A two cycle crankcase scavenged engine comprising:
   a cylinder having a piston reciprocably disposed therein, said piston and cylinder forming a combustion chamber,
   a crankcase,
   an exhaust port opening into said combustion chamber,
   exhaust system means connected to said exhaust port for conducting exhaust gas away from said engine and cooling the exhaust gas,
   means for forming an air-fuel mixture and introducing the mixture into said crankcase through an intake opening,
   a transfer passage connecting said crankcase to said combustion chamber,
   an exhaust recirculation port opening into said crankcase, and
   exhaust gas recirculation means connected to said exhaust system means for recirculating exhaust gas into said crankcase through said recirculation port.

7. The engine of claim 6 wherein said recirculation port extends through a side wall portion of said cylinder swept by said piston, said recirculation port being opened to said crankcase when the piston is at about top dead center.

8. The engine of claim 6 wherein said exhaust system means includes a muffler connected to said exhaust port, and said recirculation means comprises a recirculation passage connected between said muffler and said recirculation port.

9. The engine of claim 8 wherein said recirculation port extends through a side wall portion of said cylinder swept by said piston, said recirculation port being opened to said crankcase when the piston is at about top dead center.

10. The engine of claim 8 wherein said muffler includes a series of serially interconnected chambers and an outlet opening to the atmosphere and connected to a chamber furthest from said exhaust port, and said recirculation passage connects said recirculation port to said furthest chamber.

11. The engine of claim 8 wherein said recirculation port extends through a sidewall of said cylinder in the area of said exhaust port, and said muffler encloses both said exhaust port and recirculation port.

12. A two cycle crankcase scavenged engine comprising:
    a cylinder having a piston reciprocably disposed therein, said piston and cylinder forming a combustion chamber,
    a crankcase,
    an exhaust port opening into said combustion chamber,
    a substantially closed exhaust recirculation system means connected to said exhaust port for conducting exhaust gas away from said exhaust port and cooling the exhaust gas, said exhaust recirculation system means cooling at least a discrete charge of exhaust gas with ambient air,
    means for forming an air-fuel mixture and introducing the mixture into said crankcase through an intake opening,
    a transfer passage connecting said crankcase to said combustion chamber,
    an injection port opening into said crankcase, and
    means connected to said exhaust recirculation system means for injecting said discrete charge of exhaust gas from said exhaust recirculation system means into said crankcase through said injection port on each cycle of said engine, the injected gas being at a higher temperature than the air-fuel mixture introduced into said crankcase and at a lower temperature than exhaust gas at the exhaust port.

13. The engine of claim 12 wherein said piston includes means for alternately opening and closing said injection port on each cycle of the engine.

14. The engine of claim 12 wherein said piston and cylinder include means for alternately opening and closing said injection port on each cycle of the engine to cause a controlled charge of exhaust gas to be injected into said crankcase on each cycle.

15. The engine of claim 14 wherein said means for alternately opening and closing opens said injection port during the upstroke of said piston.

16. The engine of claim 15 wherein said means for alternately opening and closing opens said injection port at about the top dead center positon of said piston.

17. The engine of claim 14 wherein said means for alternately opening and closing opens said injection port when there is a vacuum in the crankcase and the crankcase vacuum is low.

18. The engine of claim 17 wherein said means for alternately opening and closing opens said injection port at the time in the engine cycle when the temperature of the exhaust gas is at a minimum.

* * * * *